(12) United States Patent
Iwano

(10) Patent No.: US 10,801,561 B2
(45) Date of Patent: Oct. 13, 2020

(54) ONE WAY CLUTCH

(71) Applicant: NSK-WARNER K.K., Shinagawa-ku, Tokyo (JP)

(72) Inventor: Akira Iwano, Fukuroi (JP)

(73) Assignee: NSK-WARNER K.K., Tokyo (JP)

(*) Notice: Subject to any disclaimer, the term of this patent is extended or adjusted under 35 U.S.C. 154(b) by 26 days.

(21) Appl. No.: 16/355,800

(22) Filed: Mar. 17, 2019

(65) Prior Publication Data

US 2019/0301545 A1    Oct. 3, 2019

(30) Foreign Application Priority Data

Mar. 29, 2018 (JP) ................. 2018-064639

(51) Int. Cl.
| | | |
|---|---|---|
| *F16D 43/10* | (2006.01) | |
| *F16D 45/00* | (2006.01) | |
| *F16D 41/067* | (2006.01) | |

(52) U.S. Cl.
CPC ........... *F16D 43/10* (2013.01); *F16D 41/067* (2013.01); *F16D 45/00* (2013.01)

(58) Field of Classification Search
CPC ......... F16D 41/067; F16D 43/10; F16D 45/00
USPC .................................................. 192/104 R
See application file for complete search history.

(56) References Cited

U.S. PATENT DOCUMENTS

| | | | | |
|---|---|---|---|---|
| 3,187,869 A | * | 6/1965 | Spencer ................ | F16D 41/067 192/104 B |
| 5,273,147 A | * | 12/1993 | Beigang et al. ........ | F16D 45/00 192/103 B |
| 5,823,282 A | | 10/1998 | Yamaguchi | |
| 2012/0076675 A1 | | 3/2012 | Nomura et al. | |

FOREIGN PATENT DOCUMENTS

| | | | | |
|---|---|---|---|---|
| JP | H10-067238 A | | 3/1998 | |
| JP | 2012-067862 A | | 4/2012 | |
| JP | 2019196810 A | * | 11/2019 | ............. F16D 47/04 |
| WO | WO-2016088860 A1 | * | 6/2016 | ............. F16D 47/04 |

* cited by examiner

*Primary Examiner* — Richard M Lorence
(74) *Attorney, Agent, or Firm* — SGPatents PLLC

(57) ABSTRACT

A one way clutch comprises an outer race including a radially outer first annular part to which rotation is input from outside and a radially inner second annular part capable of rotating when receiving rotation from the first annular part, an inner race provided radially inside the outer race and rotatable relative to the outer race, a plurality of torque transmission members provided between the outer race and the inner race to transmit torque between the outer race and the inner race, and a coupling mechanism that couples the first annular part and the second annular part together to make them integrally rotatable when the speed of rotation input from outside is lower than a specific speed and decouples them when the speed of rotation exceeds the specific speed.

6 Claims, 5 Drawing Sheets

ONE WAY CLUTCH

The disclosure of the following priority application is herein incorporated by reference:
Japanese Patent Application No. 2018-064639 filed on Mar. 29, 2018.

TECHNICAL FIELD

The present invention relates to a one way clutch that is used for the purpose of transmission of torque, backstop and the like in vehicles and industrial machines.

BACKGROUND ART

Hybrid vehicles have a drive system that uses both an internal combustion engine and an electric motor (which will be simply referred to as "engine" and "motor" respectively). Such hybrid vehicles use both the engine and the motor as drive sources for an oil pump used to lubricate relevant devices in the driving system with oil. Patent Literatures 1 and 2 in the citation list below disclose clutch apparatuses used to selectively transmit driving forces input from these two driving sources to an output member connected with the drive shaft of the oil pump.

Such a clutch apparatus includes two one way clutches that are coaxially arranged side by side along their axial direction. The outer races of the two one way clutches are respectively driven by the driving member of the engine and the driving member of the motor, and the rotations of the outer races are transmitted to the inner race that functions as the common output member of the two one way clutches.

CITATION LIST

Patent Literature

Patent Literature 1: Japanese Patent Application Laid-Open No. H10-67238
Patent Literature 1: Japanese Patent Application Laid-Open No. 2012-67862

SUMMARY OF INVENTION

Technical Problem

There are demands for motors having high rotation speed and high output power as driving apparatuses used in hybrid vehicles. However, in cases where a motor having high rotation speed is used as an input power source for a conventional one way clutch, if the highest rotation of such a high speed motor is transmitted to the one way clutch, problems such as increased frictional resistance and problems relating to durability such as seizure will result. Moreover, there is a possibility that the one way clutch may not be locked stably, and a slip may occur. A slip occurring in the one way clutch makes its torque transmission unstable. In order to stabilize the torque transmission, a control apparatus for controlling the rotation speed input from the high speed motor to the one way clutch may be provided separately from the one way clutch. However, this leads to an increase in the overall size of the apparatus including the one way clutch.

The present invention has been made in the above circumstances, and an object of the present invention is to provide a one way clutch capable of regulating the input rotation speed that is input through an input shaft on the power source side without an increase in the size.

Solution to Problem

To solve the above problem, according to the present invention, there is provided a one way clutch comprising:
an outer race including a radially outer first annular part to which rotation is input from outside and a radially inner second annular part capable of rotating when receiving rotation from said first annular part;
an inner race provided radially inside said outer race and rotatable relative to said outer race;
a plurality of torque transmission members provided between said outer race and said inner race to transmit torque between said outer race and said inner race; and
a coupling mechanism that couples said first annular part and said second annular part together to make them integrally rotatable when the speed of rotation input from outside is lower than a specific speed and decouples them when the speed of rotation exceeds said specific speed.

Advantageous Effect of the Invention

The present invention can provide a one way clutch capable of regulating the input rotation speed that is input through an input shaft on the power source side without an increase in the size.

EMBODIMENT FOR CARRYING OUT THE INVENTION

In the following, a one way clutch according to an embodiment of the present invention will be described with reference to the accompanying drawings. The one way clutch according to the embodiment is one used in a hybrid vehicle, which has a drive apparatus using both an engine and a motor, to transmit a driving force of the engine or the motor to the drive shaft of an oil pump that supplies oil to lubricate relevant devices in the drive system.

Figure 2:
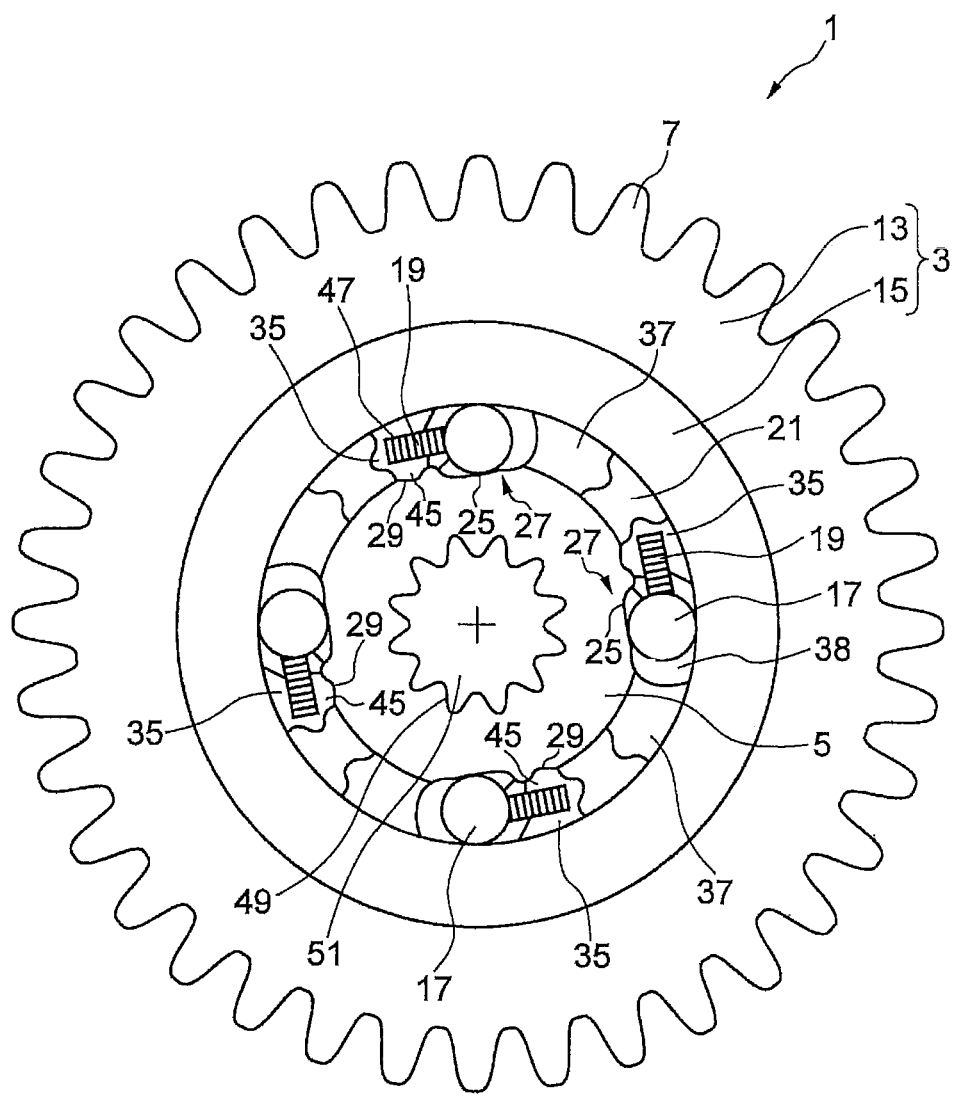
FIG. 2 is a cross sectional view taken along line II-II in FIG. 1.
Figure 3:
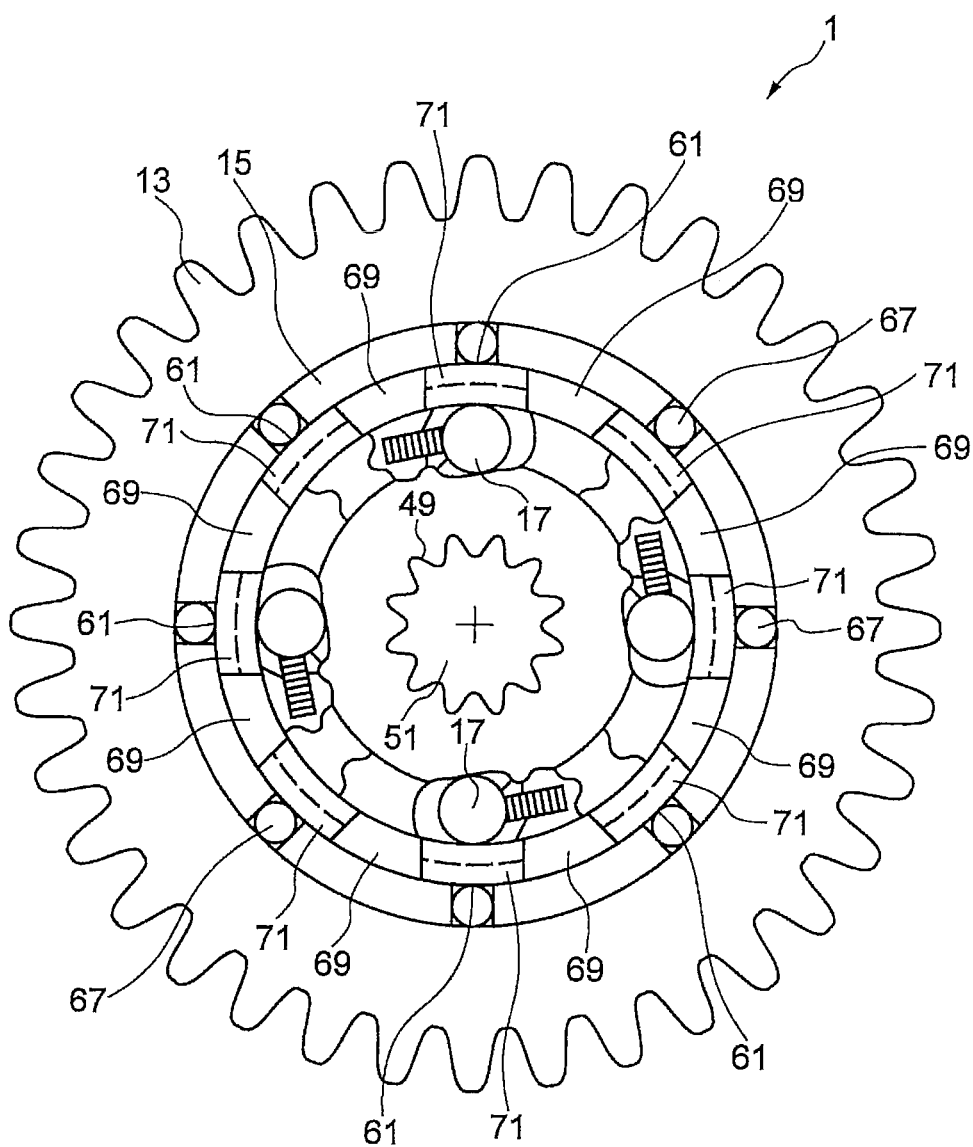
FIG. 3 is a diagram showing the outer appearance of the one way clutch seen from the first axial direction, where a slide plate, a disc spring, and a plate in FIG. 1 are not illustrated.

Before the description, some terms relating to directions about the one way clutch according to the embodiment will be defined. In the description of the embodiment, the term "center axis" refers to the center axis of the one way clutch, and the terms "axial direction", "radial direction", and "circumferential direction" respectively refer to the axial direction, radial direction, and circumferential direction with respect to that center axis. As to the axial directions, the term "first axial side" refers to the right side in FIGS. 1, 4, and 5, and the term "second axial side" refers to the left side in FIGS. 1, 4, and 5. In FIGS. 2 and 3, the front side of the plane of the drawing sheets (namely, the side facing the viewer of FIGS. 2 and 3) is the first axial side, and the back side of the plane of the drawing sheets (namely, the side facing away from the viewer of FIGS. 2 and 3) is the second axial side. As to the circumferential directions, the right-hand turning direction in FIGS. 2 and 3 will be referred to as the first circumferential direction or the clockwise direction, and the left-hand turning direction in FIGS. 2 and 3 will be referred to as the second circumferential direction or the anticlockwise direction.

Figure 1:
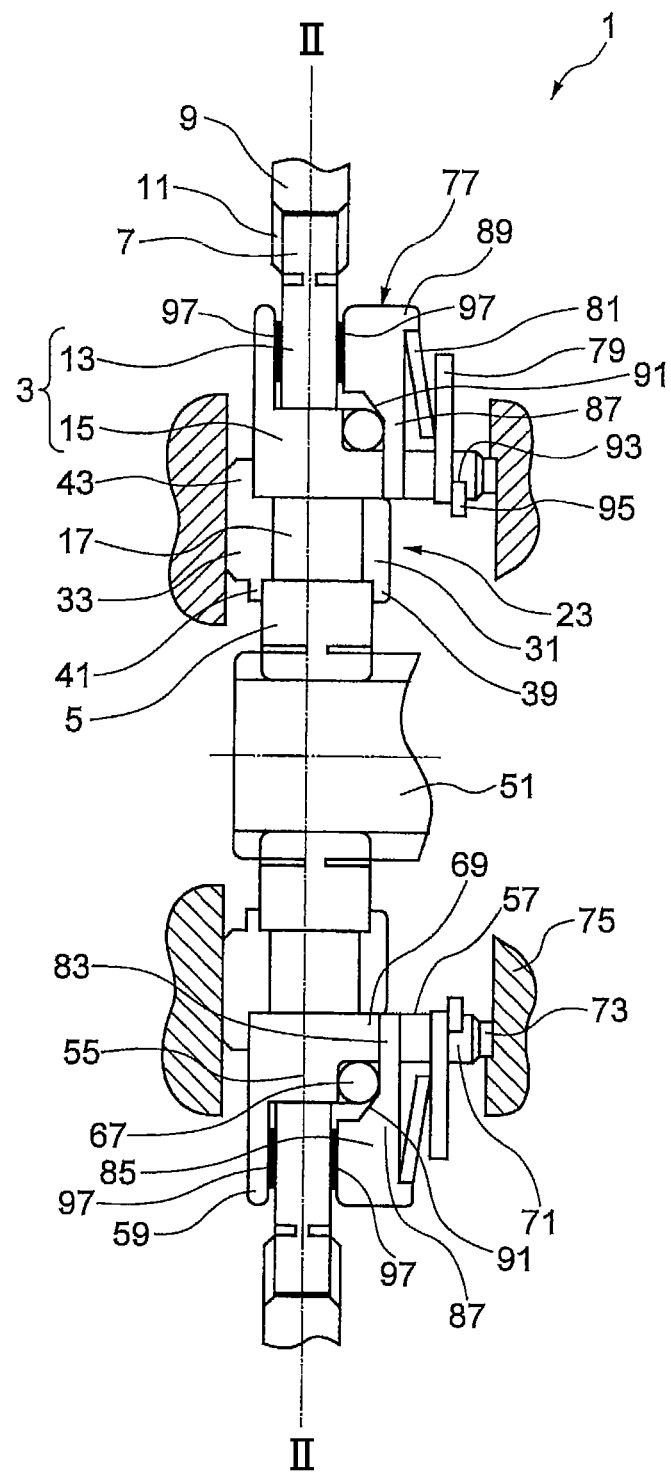
FIG. 1 is a cross sectional view taken along the center axis of the one way clutch according to an embodiment, where a first annular part and a second annular part of the outer race are shown in a coupled state.

FIG. 1 is a cross sectional view taken along the center axis of the one way clutch according to the embodiment, where a first annular part and a second annular part of the outer race are shown in a coupled state. FIG. 2 is a cross sectional view taken along line II-II in FIG. 1. FIG. 3 shows the outer appearance of the one way clutch seen from the first axial direction, where a slide plate, a disc spring, and a plate in FIG. 1 are not illustrated.

The one way clutch 1 according to the embodiment includes an outer race 3 and an inner race 5, which is arranged coaxially with and radially inside the outer race 3 and rotatable relative to the outer race 3. The outer circumference of the outer race 3 is provided with splines 7, which mesh with splines 11 provided on the inner circumference of an input shaft 9. Either rotation of the output shaft of the engine or rotation of the output shaft of the motor is transmitted to the input shaft 9. The transmission of rotation of the output shaft of the engine and rotation of the output shaft of the motor are switched by a gear system, which is not shown in the drawings. Thus, either rotation of the output shaft of the engine or rotation of the output shaft of the motor is transmitted to the one way clutch 1 through the input shaft 9.

The outer race 3 includes a radially outer first annular part 13, a radially inner second annular part 15, and the one way clutch 1 has a coupling mechanism that couples and decouples the first annular part 13 and the second annular part 15. The first annular part 13 and the second annular part 15 are arranged coaxially and rotatable relative to each other. When coupled by the coupling mechanism, the first annular part 13 and the second annular part 15 rotate integrally. The structure of the first annular part 13, the second annular part 15, and the coupling mechanism will be specifically described later. In the following description, the expression "outer race 3" will be used to refer to its entirety including the first annular part 13 and the second annular part 15. The expression "the inner circumferential surface of the outer race 3" will refer to the inner circumferential surface of the second annular part 15.

The one way clutch 1 includes a plurality of rollers that are provided between the inner circumferential surface of the outer race 3 and the outer circumferential surface of the inner race 5 to function as torque transmission members, coil or accordion springs 19 that bias the rollers 17 in such a direction as to bring the outer race 3 and the inner race 5 into engagement with each other, block bearings 21, and a retainer 23 made of a resin, which retains the rollers 17 and the block bearings 21.

The outer circumferential surface of the inner race 5 is provided with a plurality of cam portions 27 each of which has a cam surface 25 with which the roller 17 engages. In this embodiment, there are four cam portions 27 in total. The cam portions 27 are arranged at certain intervals along the circumferential direction. The cam portion 27 is a recess that is dished radially inwardly from the outer circumferential surface of the inner race 5. The cam surface 25 of the cam portion 27 is a slant surface that is inclined in such a way that its radial distance to the inner circumferential surface of the outer race 3 increases as it extends from the first circumferential end to the second circumferential end of the recess. The cam surface 25 smoothly joins to the outer circumferential surface of the inner race 5 at both circumferential ends. The outer circumferential surface of the inner race 5 is provided with a plurality of (four, in this embodiment) axial grooves 29, which are arranged at certain intervals along the circumferential direction.

The roller 17 is a cylindrical member. The roller 17 is oriented in such a way that its axis is parallel to the axial direction of the outer ring 3 and the inner ring 5. The roller 17 slides or rolls on the cam surface 25 of the cam portion 27.

The block bearing 21 has a circumferential dimension (i.e. the dimension along the circumferential direction) that gradually decreases from the upper and lower ends toward the center along the radial direction. In other words, the circumferential side surfaces of the block bearing 21 is constricted at the center. There are a plurality of (four, in this embodiment) block bearings 21, which are arranged at substantially uniform intervals along the circumferential direction. The block bearings 21 maintain the radial gap between the outer race 3 and the inner race 5 and keep the outer race 3 and the inner race 5 coaxial with each other.

As shown in FIGS. 1 and 2, the retainer 23 includes a first annular portion 31 disposed on the first axial side of the rollers 17, a second annular portion 33 disposed on the second axial side of the rollers 17, and a plurality of first pillar portions 35, and a plurality of second pillar portions 37. The first pillar portions 35 and the second pillar portions 37 connect the first annular portion 31 and the second annular portions 33 along the axial direction. One first pillar portion 35 and one second pillar portion arranged in order from the first circumferential side toward the second circumferential side to form a pair. The first pillar portions 35 and the second pillar portions 37 are arranged alternatively all along the circumference of the retainer 23. Thus, there are a plurality of (four, in this embodiment) pairs of the first and second pillar portions 35, 37.

As shown in FIG. 1, the radially inner edge of the first annular portion 31 of the retainer 23 has a flange 39 that extends radially inwardly. The second axial side surface of the flange 39 abuts on the first axial side end surface of the inner race 5. The radially inner edge of the second annular portion 33 of the retainer 23 has a flange 41 that extends radially inwardly. The first axial side surface of the flange 41 abuts on the second axial side end surface of the inner race 5. The radially outer edge of the second annular portion 33 of the retainer 23 has a flange 43 that extends radially outwardly. The first axial side surface of the flange 43 abuts on the second axial side end surface of the second annular portion 15 of the outer race 3. Thus, axial movement of the retainer 23 is prevented.

The radially inner periphery of the first pillar portion 35 of the retainer 23 is provided with a projection 45 that projects radially inwardly and extends in the axial direction. The projection 45 engages with an axial groove provided on the outer circumferential surface of the inner race 5. This engagement prevents the retainer 23 from rotating relative to the inner race 5. In consequence, the retainer 23 rotates integrally with the inner race 5.

The second circumferential side surface of the first pillar portion 35 of the retainer 23 is curved in such a shape that agrees with the depression of the first circumferential side surface of the block bearing 21, so that the second circumferential side surface of the first pillar portion 35 is in contact with the first circumferential side surface of the block bearing 21 in its entirety. The first circumferential side surface of the second pillar portion 37 of the retainer 23 is curved in such a shape that agrees with the depression of the second circumferential side surface of the block bearing 21, so that the first circumferential side surface of the second pillar portion 37 is in contact with the second circumferential side surface of the block bearing 21 in its entirety. Thus, the first pillar portion 35 and the second pillar portion 37 prevent circumferential movement and radially outward rattling of the block bearing 21.

The first circumferential side surface of the first pillar portion 35 of the retainer 23 and the second circumferential side surface of the second pillar portion 37 of the same are circumferentially opposed to each other with a certain gap. The first circumferential side surface of the first pillar portion 35 and the second circumferential side surface of the second pillar portion 37 form a space 38 therebetween, in which one roller 17 is disposed. The first circumferential side surface of the first pillar portion 35 is provided with a recess 47, in which a spring 19 is provided to bias the roller 17 in the direction of engagement with the cam surface 25, namely in the first circumferential direction.

The inner race 5 has a shaft hole 49 at its center, in which an output shaft 51 is fitted with serrations. The output shaft 51 is connected to a drive shaft of an oil pump, which is not shown in the drawings. Thus, the one way clutch 1 transmits rotation of the output shaft of the engine or motor input to the outer race 3 through the input shaft 9 to the inner race 5 via the rollers 17 functioning as torque transmission members and outputs it as rotation of the output shaft 51 fitted in the inner race 5.

When the outer race 3 of the one way clutch 1 according to the embodiment rotates in the clockwise direction, the rollers 17 engage with the cam surfaces 25 of the inner race 5 and the inner circumferential surface of the outer race 3, so that the outer race 3 and the inner race 5 rotate integrally. Thus, rotation is transmitted from the outer race 3 to the inner race 5. When the outer race 3 rotates in the anticlockwise direction, the rollers 17 do not engage with the cam surfaces 25 of the inner race 5, so that the outer race 3 rotates freely relative to the inner race 5. In this state, rotation is not transmitted from the outer race 3 to the inner race 5.

Next, the outer race 3 of the one way clutch 1 and the coupling mechanism of the outer race 3 will be described. As described above, the outer race 3 of the one way clutch 1 according to the embodiment is composed of the radially outer first annular part 13 and the radially inner second annular part 15. The outer circumference of the first annular part 13 is provided with splines 7. The splines 7 of the first annular part 13 mesh with the splines 11 on the input shaft 9 in such a way as to allow axial movement. Thus, the first annular part 13 is movable in the axial direction relative to the input shaft 9 and relative to the second annular part 15 at the same time.

Figure 4:
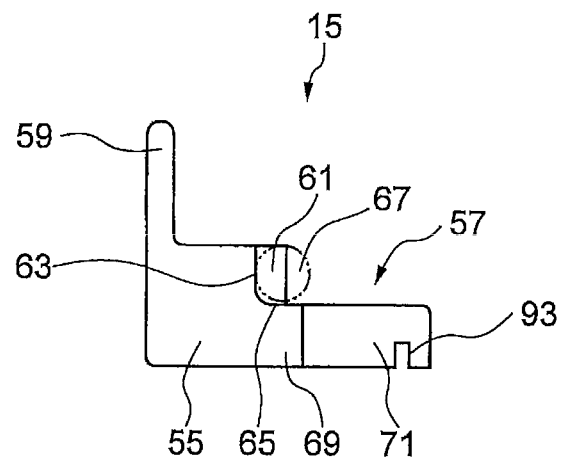
FIG. 4 is a cross sectional view of the second annular part of the outer race taken along the center axis.
Figure 4:
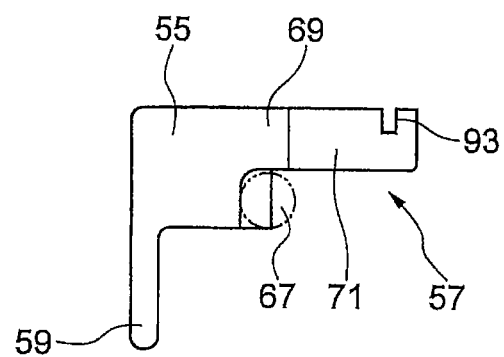

FIG. 4 is a cross sectional view of the second annular part 15 of the outer race taken along the center axis.

As shown in FIG. 4, the second annular part 15 of the outer race 3 is composed of a hollow cylindrical body portion 55, an axially extending portion 57 that extends from the first axial side end of the body portion 55 toward the first axial direction and has a diameter smaller than the body portion 55, and a flange portion 59 that extends radially outwardly from the second axial side end of the body portion 55. The body portion 55, the axially extending portion 57, and the flange portion 59 are portions of the second annular part 15 integrally formed as a monolithic piece.

The outer circumferential surface of the body portion 55 of the second annular part 15 is opposed to the inner circumferential surface of the first annular part 13. The inner circumferential surface of the body portion 55 is a surface on/with which the rollers 17 roll/engage. The flange portion 59 of the second annular part 15 is located on the second axial side of the first annular part 13 and opposed to the second axial side surface of the first annular part 13. The outer diameter of the body portion 55 of the second annular part 15 is substantially equal to the inner diameter of the first annular part 13. When the first annular part 13 and the second annular part 15 rotate relative to each other, the inner circumferential surface of the first annular part 13 and the outer circumferential surface of the body portion 55 of the second annular part slide smoothly with the aid of lubricating oil. The outer circumferential surface of the body portion 55 has an axial dimension larger than the inner circumferential surface of the first annular part 13.

The body portion 55 of the second annular part 15 has a plurality of grooves 61 provided at the radially outer portion of its first axial side end. The grooves 61 open on the first axial side end surface and the outer circumferential surface of the body portion 55. In this embodiment, there are eight grooves 61, which are arranged at equal intervals along the circumferential direction, as shown in FIG. 3. Each groove has a radial bottom surface that extends radially inwardly from the outer circumferential surface of the body portion 55 and an axial bottom surface that extends in the second axial direction from the middle of the radially outer edge and the radially inner edge of the first axial side end surface of the body portion 55. The radial bottom surface 63 is longer than the axial bottom surface 65. Therefore, the groove 61 extends in the radial direction. The radial bottom surface 63 and the axial bottom surface 65 join smoothly.

A ball 67 made of a steel is placed in each groove 61. The ball 67 rolls or slides on the radial bottom surface 63. In the following description, the opening of the groove 61 on the first axial end surface of the body portion 55 will be referred to as the "axial side opening of the groove 61", and the opening on the outer circumferential surface of the body portion 55 will be referred to as the "radially outside opening of the groove 61".

Figure 5:
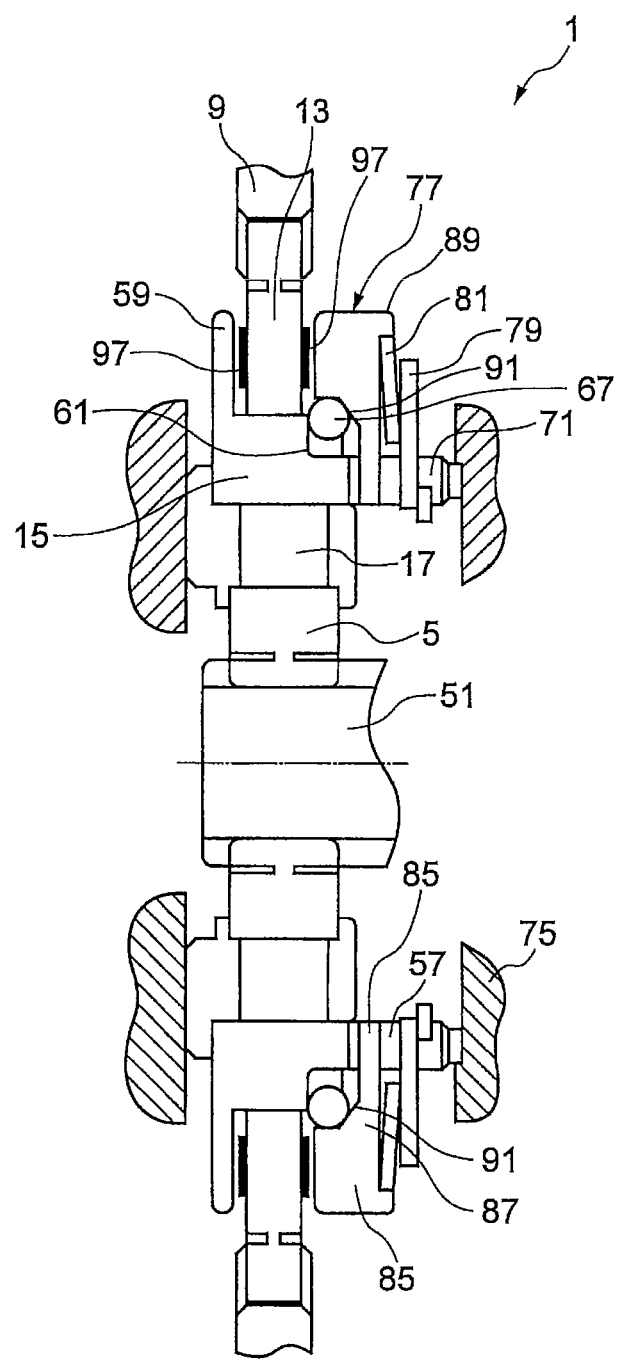
FIG. 5 is a cross sectional view of the one way clutch according to the embodiment taken along the center axis, where the first annular part and the second annular part of the outer race are shown in a decoupled state.

The first axial side end portion of the body portion 55 of the second annular part 15 constitutes a cylindrical portion 69 that projects toward the first axial side beyond the axial side openings of the grooves 61. The cylindrical portion 69 is a portion radially inside the grooves 61. The outer diameter of the cylindrical portion 69 is smaller than the outer diameter of the body portion 55. On the first axial side end of the cylindrical portion 69, there are provided a plurality of projecting portions 71 that project toward the first axial side, which are arranged at equal intervals along the circumferential direction. In this embodiment, there are eight projecting portions 71, as shown in FIG. 3. In FIGS. 1, 4, and 5, the uppermost and lowermost projecting portions 71 are shown, and the other projecting portions are not shown. The axially extending portion 57 of the second annular part 15 is composed of the cylindrical portion 69 and the plurality of projecting portions 71.

The outer circumferential surface of the projecting portion 71 has a curvature equal to the outer circumferential surface of the cylindrical portion 69 and is continuous with the outer circumferential surface of the cylindrical portion 69. The inner circumferential surface of the projecting portion 71 has a curvature equal to the inner circumferential surface of the cylindrical portion 69 and is continuous with the inner circumferential surface of the cylindrical portion 69. As shown in FIG. 3, the projecting portion 71 extends in the circumferential direction in a certain length to form a section of a cylindrical shape. The end surface of the cylindrical portion 69 between circumferentially adjacent projecting portions 71 has a circumferential length substantially equal to the circumferential length of each projecting portion 71. The projecting portions 71 are fixed to an annular member 73 at their respective first axial side ends. The annular member 73 is rotatably attached to a peripheral member 75 external to the one way clutch 1.

The second annular part 15 of the outer race 3 is provided with the coupling mechanism that couples and decouples the first annular part 13 and the second annular part 15 of the outer race 3. The coupling mechanism is composed of the grooves 61 on the body portion 55 of the second annular part 15, the balls 67 respectively provided in the grooves 61, an annular slide plate 77 disposed on the first axial side of the first annular part 13 and the body portion 55 of the second annular part 15 on the axially extending portion 57 of the second annular portion 15, an annular plate 79 disposed on the first axial side of the slide plate 77 on the axially extending portion 57, a disc spring 81 provided between the slide plate 77 and the annular plate 79, and the flange portion 59 of the second annular part 15 opposed to the first annular part 13 on the second axial side of the first annular part 13. The disc spring 81 is adapted to always bias the slide plate 77 toward the second axial side. This will be specifically described later.

The ball 67 has a diameter slightly smaller than the width of the groove 61. This eliminates wobbling of the balls between the walls of the groove 61 opposed to each other in the width direction, so that the ball can move smoothly in the radial direction on the radial bottom surface 63 of the groove 61. The diameter of the ball 67 is slightly smaller than the length of the radial bottom surface 63 of the groove 61 and larger than the length of the axial bottom surface 65. Therefore, when the ball 67 is located at the radially innermost position in the groove 61 as shown in FIGS. 1 and 4, in other words when the ball 67 is in contact with the radial bottom surface 63 and the axial bottom surface 65, the ball does not protrude outside from the radially outside opening of the groove 61 but partly protrudes outside from the axial side opening of the groove 61.

The annular slide plate 77 is disposed at the second axial side end of the extending portion 57 of the second annular part 15. The annular slide plate 77 includes a radially inner plate portion 83, a thick portion 85 on the radially outer side of the plate portion 83, and a radially middle portion 87 between the plate portion 83 and the thick portion 85. The plate portion 83, the radially middle portion 87, and the thick portion 85 are portions of the annular slide plate 77 integrally formed as a monolithic piece. The first axial side surfaces of these portions constitute a single continuous surface that extends in the radial direction.

The plate portion 83 of the slide plate 77 is provided with a plurality (eight, in this embodiment) of through-holes (not shown), which are arranged at equal intervals along the circumferential direction. The projecting portions 71 of the axially extending portion 57 of the second annular part 15 are fitted in the through-holes in such a way as to allow relative movement of them in the axial direction. This prevents radial movement of the slide plate 77 relative to the second annular part 15 of the outer race 3 and allows axial movement of the slide plate 77 in the axial direction. In the state in which each ball 67 is located radially innermost position in each groove 61 (see FIG. 1), the second axial side surface of the plate portion 83 is opposed to the cylindrical portion 69 of the second annular part 15 and the balls 67 in the axial direction.

The axial location of the second axial side surface of the thick portion 85 of the slide plate 77 is on the second axial side of the axial location of the second axial side surface of the plate portion 83. The second axial side surface of the thick portion 85 is opposed to the first axial side surface of the first annular portion 13 of the outer race 3. The radially outer edge of the first axial side surface of the thick portion 85 is provided with a flange 89 that projects therefrom in the first axial direction.

The second axial side surface of the radially middle portion 87 of the slide plate 77 is a slant surface 91 that is inclined in such a way as to approach the first annular part 13 of the outer race 3 as it extends radially outwardly. The slant surface 91 continuously joins to the inner circumference of the thick portion 85. In the state in which each ball 67 is located radially innermost position in each groove 61, the radially inner end portion of the slant surface 91 is in contact with the balls 67, and the portion of the slant surface 91 other than the radially inner end portion is located radially outside the balls 67 without being in contact with the balls 67.

The annular plate 79 is disposed at the second axial side end of the axially extending portion 57 of the second annular part 15. The plate 79 is a flat plate member. The radially inner portion of the plate 79 is provided with a plurality of (eight, in this embodiment) through holes (not shown), which are arranged at equal intervals along the circumferential direction. The projecting portions 71 of the axially extending portion 57 of the second annular part are respectively fitted in these through-holes. The radially inner portion of each projecting portion 71 is provided with a circumferential groove 93, in which a retaining ring 95 is fitted. The plate 79 is in contact with the second axial side surface of the retaining ring 95. With the above structure, the plate 79 is fixed on the second annular part 15 of the outer race 3 with its movement in the axial direction being prevented.

The disc spring 81 is set between the slide plate 77 and the plate 79 in an elastically deformed state. The radially inner edge of the disc spring 81 abuts on the radially inner portion of the plate 79, and the radially outer edge of the disc spring 81 engages with the flange 89 of the slide plate 77. With this engagement, the slide plate 77 is always biased by the disc spring 81 toward the second axial side.

The flange portion 59 of the second annular part 15 is opposed to the second axial side surface of the first annular part 13. The first annular part 13 is disposed between the flange portion 59 of the second annular part 15 and the thick portion 85 of the slide plate 77. A friction member 97 is attached to each of the first and second axial side surfaces of the first annular part 13.

As described above, the slide plate 77 is always biased toward the second axial side by elastic force of the disc spring 81. When each ball 67 is located at the radially innermost position in the groove 61 (see FIG. 1), the second axial side surface of the thick portion 85 of the slide plate 77 is pressed against the first axial side surface of the first annular part 13 by the biasing force of the disc spring 81. The first annular part 13 is pressed by the slide plate 77 toward the second axial side and pressed against the flange portion 59 of the second annular part 15. In consequence, the first annular part 13 is held between the thick portion 85 of the slide plate 77 and the flange portion 59 of the second annular part 15. Thus, the friction members 97 on both axial side surfaces of the first annular part 13 are in frictional engagement with the thick portion 85 of the slide plate 77 and the flange portion 59 of the second annular part 15, whereby the first annular part 13 and the second annular part 15 are coupled. In this state, the first annular part 13 and the second annular part 15 rotate together integrally.

Now, the operation of the one way clutch 1 according to the embodiment will be described.

The one way clutch 1 according to the embodiment is configured in such a way that when the number of rotations per unit time of the input shaft connected to the output shaft of the engine or the motor exceeds a specific number of rotations, transmission of rotation from the outer race to the inner race 5 is interrupted so that rotation faster than that will not be transmitted.

In the one way clutch 1, when the engine or the motor is not operating, as shown in FIG. 1, balls 67 are located at the radially innermost positions in the respective grooves 61, the first annular portion 13 is held between the thick portion 85 of the slide plate 77 and the flange portion 59 of the second annular part 15 by the biasing force of the disc spring 81, and the first annular part 13 and the second annular part 15 are coupled together. When the engine or the motor starts to operate in this state and rotation of the output shaft of the engine or the motor is transmitted to the input shaft 9, the rotation of the input shaft 9 is transmitted to the first annular part 13 of the outer race 3. Since the first annular part 13 and the second annular part 15 of the outer race 3 are coupled together, as the first annular part 13 rotates, the second annular part 15 rotates integrally with the first annular part 13. In this state, rotation of the output shaft of the engine or the motor input to the one way clutch 1 through the input shaft 9 is transmitted to the inner race 5 by the rollers 17 and output as rotation of the output shaft 51.

As the second annular part 15 rotates integrally with the first annular part 13, a centrifugal force acts on each of the balls 67 in the grooves 61 of the second annular part 15. As the number of rotations of the input shaft 9 per unit time increases and the number of rotations per unit time of the second annular part 15 increases accordingly, the centrifugal force acting on each ball 67 also increases.

In the case where rotation is transmitted to the input shaft 9 from the output shaft of the engine, or in the case where rotation is transmitted to the input shaft 9 from the output shaft of the motor with the rotation speed of the motor falling within the range from a low rotation speed range to a rotation speed range corresponding to normal running of the vehicle, the centrifugal force acting on all the balls 67 does not exceed the biasing force of the disc spring 81 that biases the slide plate 77 toward the second axial side. In consequence, the balls 67 do not move, and the first annular part 13 and the second annular part 15 rotate integrally, so that rotation is transmitted from the input shaft 9 to the output shaft 51.

In the case where rotation is transmitted to the input shaft 9 from the output shaft of the motor with the rotation speed of the motor falling within a high rotation speed range, the number of rotations per unit time of the input shaft 9 exceeds the specific number of rotations. Then, the number of rotations per unit time of the second annular part 15 coupled with the first annular part 13 exceeds the specific number of rotations. In this state, the centrifugal force acting on all the balls 67 exceeds the biasing force of the disc spring 81 that biases the slide plate 77 toward the second axial side. In consequence, each of the balls 67 rolls on the radial bottom surface 63 of the groove 61 due to the centrifugal force to move in the radially outward direction. As the ball 67 moves in the radially outward direction, the ball protrudes from the radially outside opening of the groove 61 to abut on the slant surface 91 of the slide plate 77. Then, the ball 67 further rolls on the radial bottom surface 63 of the groove 61 in the radially outward direction and rolls on the slant surface 91 of the slide plate 77 radially outward.

Since the movement of the slide plate 77 in the radial direction is restricted, as the balls 67 slide on the slant surface 91 of the slide plate 77 radially outward, the slide plate 77 moves toward the first axial side relative to the axially extending portion 57 of the second annular part 15, as shown in FIG. 5. As the slide plate 77 moves toward the first axial side, the thick portion 85 of the slide plate 77 and the first annular part 13 are disengaged. At the same time, the flange portion 59 of the second annular part 15 and the first annular part 13 are also disengaged.

In this state, the first annular part 13 and the second annular part 15 are decoupled, and the input shaft 9 and the first annular part 13 rotate freely relative to the second annular part 15. Hence, high speed rotation input to the first annular part 13 from the input shaft 9 is not transmitted to the inner race 5. Even after the first annular part 13 and the second annular part 15 are decoupled, the second annular part 15, which has been rotating before decoupling, continues to rotate by inertia. Consequently, rotation of the second annular part 15 is transmitted to the inner race 5 by the rollers 17 and output as rotation of the output shaft 51. Thus, driving of the drive shaft of the oil pump continues.

If thereafter rotation transmitted to the input shaft 9 is switched to the output of the engine or the rotation speed of the motor decreases and the number of rotations per unit time of the input shaft 9 becomes lower than the specific number of rotations, the centrifugal force acting on the balls 67 becomes smaller than the biasing force of the disc spring 81. Then, the slide plate 77 is moved toward the second axial side by the biasing force of the disc spring 81, and each ball 67 slides on the slant surface 91 of the slide plate 77 to move radially inward in the groove 61. Eventually, the thick portion 85 of the slide plate 77 is brought into engagement with the first annular part 13 of the outer race 3 by the biasing force of the disc spring 81, and the flange portion 59 of the second annular part 15 also engages with the first annular part 13. The friction members 97 attached to both axial side surfaces of the first annular part 13 lessen the impact of engagement of the thick portion 85 of the slide plate 77 and the flange portion 59 of the second annular part 15 with the first annular part 13 to help smooth engagement. Thus, the first annular part 13 and the second annular part 15 are coupled together, and rotation of the output shaft of the engine or the motor transmitted to the input shaft 9 is transmitted to the inner race 5 and output as rotation of the output shaft 51.

As above, the one way clutch 1 according to the embodiment transmits rotation transmitted to the input shaft 9 from the output shaft of the engine or the motor from the outer race 3 to the inner race 5 when the number of rotations per unit time of the input shaft 9 is smaller than the specific number of rotations and interrupts the transmission of rotation from the outer race 3 to the inner race 5 when the number of rotations per unit time of the input shaft 9 exceeds the specific number of rotations. As above, according to the embodiment, it is possible to regulate the rotation speed input to the one way clutch 1 through the input shaft 9 on the power source side without the need for providing a control apparatus separately from the one way clutch 1. Hence, it is possible to prevent upsizing of the one way clutch 1 and to enable stable torque transmission even when a high speed motor is used as the input power source.

The number of rotations per unit time of the input shaft as the threshold for coupling and decoupling of the first annular part 13 and the second annular part 15 of the outer race 3 is selected appropriately taking into consideration various factors, such as the number of the rollers 17 in the one way clutch 1, the size of the outer race 3 and the inner race 5, and the output power of the motor.

The one way clutch according to the present invention is not limited to the above-described embodiment. Various modifications may be made to the embodiment. For example, the number of the rollers 17 may be changed fitly according to the required torque capacity. The rollers 17 as the torque transmission members may be replaced by sprags. Torque may be transmitted through a ratchet mechanism.

REFERENCE SINGS LIST

1: one way clutch
3: outer race
5: inner race
9: input shaft
13: first annular part
15: second annular part
17: roller
23: retainer
25: cam surface
51: output shaft
55: body portion
57: extending portion
59: flange portion
61: groove
63: radial bottom surface
65: axial bottom surface
67: ball
69: cylindrical portion
77: slide plate
79: plate
81: disc spring
91: slant surface
97: friction member

What is claimed is:

1. A one way clutch comprising:
an outer race including a radially outer first annular part to which rotation is input from outside and a radially inner second annular part capable of rotating when receiving rotation from said first annular part;
an inner race provided radially inside said outer race and rotatable relative to said outer race;
a plurality of torque transmission members provided between said outer race and said inner race to transmit torque between said outer race and said inner race; and
a coupling mechanism that couples said first annular part and said second annular part together to make them integrally rotatable when the speed of rotation input from outside is lower than a specific speed and decouples them when the speed of rotation exceeds said specific speed.

2. A one way clutch according to claim 1, wherein said coupling mechanism comprises an annular movable member disposed on a first axial side of said first annular part, opposed to said first annular part in the axial direction, and provided on said second annular part in an axially movable manner and an elastic member that biases said movable member toward a second axial side, and said first annular part and said second annular part are coupled to become integrally rotatable by engagement of said movable member biased by said elastic member with said first annular part.

3. A one way clutch according to claim 2, wherein
said second annular part and said movable member have respective opposed portions opposed to each other in the axial direction, the gap between said opposed portions decreasing toward the radially outward direction,
said coupling mechanism further comprises a plurality of radially extending grooves provided on said opposed portion of said second annular part at certain intervals along the circumferential direction, and a plurality of balls each of which is disposed in each of said plurality of grooves and in contact with said movable member, and
said plurality of balls are moved by centrifugal force generated by their rotation with said second annular part, thereby moving said movable member in the first axial direction to decouple said first annular part and said second annular part.

4. A one way clutch according to claim 3, wherein said movable member has a slant portion inclined in such a way as to approach said first annular part as it extends radially outwardly, and said plurality of balls move in said grooves along said slant portion.

5. A one way clutch according to claim 3, wherein said plurality of balls move in said grooves when speed of rotation input from outside exceeds said specific speed.

6. A one way clutch according to claim 4, wherein said plurality of balls move in said grooves when speed of rotation input from outside exceeds said specific speed.

* * * * *